(12) United States Patent
Bowers (10) Patent No.: US 6,282,935 B1
(45) Date of Patent: Sep. 4, 2001

(54) METAL FORMING APPARATUS

(75) Inventor: Carl W. Bowers, Virginia Beach, VA (US)

(73) Assignee: Metal Accessories, LLC, Suffolk, VA (US)

( * ) Notice: Subject to any disclaimer, the term of this patent is extended or adjusted under 35 U.S.C. 154(b) by 0 days.

(21) Appl. No.: 09/546,424

(22) Filed: Apr. 10, 2000

(51) Int. Cl.[7] .................................................. B21D 5/08
(52) U.S. Cl. ............................. 72/131; 72/181; 83/697
(58) Field of Search ........................... 72/131, 129, 181, 72/179; 83/636, 620, 697

(56) References Cited

U.S. PATENT DOCUMENTS

| | | | | |
|---|---|---|---|---|
| 125,691 | * | 4/1872 | Price | 72/181 |
| 164,567 | * | 6/1875 | Laing | 72/181 |
| 4,206,625 | * | 6/1980 | Vegh | 72/181 |
| 4,811,587 | * | 3/1989 | Knudson | 72/131 |
| 4,899,566 | * | 2/1990 | Knudson | 72/129 |
| 5,148,694 | * | 9/1992 | Pearson | 72/131 |
| 5,551,272 | * | 9/1996 | Knudson | 72/181 |
| 5,732,582 | * | 3/1998 | Knudson | 72/131 |
| 5,740,687 | * | 4/1998 | Meyer | 72/131 |
| 5,787,748 | * | 8/1998 | Knudson | 72/181 |

* cited by examiner

Primary Examiner—Daniel C. Crane
(74) Attorney, Agent, or Firm—Arthur L. Girard (57) ABSTRACT

A compact, portable metal forming device comprising: 1) a frame having entry and exit ends; 2) guide means adjacent the entry end for guiding a sheet of metal to be formed to a hand operated drive assembly supported within the frame that engages the metal sheet and drives it, through the operation of a series of gear linked separately journaled forming roll pairs mounted in the frame, 3) adjacent the exit end an adjustable cam wheel that engages one edge of the metal sheet and forms that edge just prior to the metal sheet reaching the exit end, and 4) forming the exit end, a guillotine cutter including a shaped exit aperture for cutting the formed metal sheet to any selected length.

8 Claims, 9 Drawing Sheets

METAL FORMING APPARATUS

FIELD OF THE INVENTION

The present invention relates to equipment for the on-site fabrication of metal roofing flashing and the like and more particularly to portable such equipment that is easily transported from site to site.

BACKGROUND OF THE INVENTION

The fabrication of metallic flashing and the like for use in the installation of roofs is largely a custom operation generally necessitating that fabrication be performed on site. As a rule, such fabrication is done by hand using small metal bending equipment such as portable metal breaks or the like using metal cut from a coil or in sheet form that is carried to the job site. Often the width of a suitable section of, for example flashing must be cut from an oversized coil or sheet marketed to meet the needs of a broad range of customers, but not specifically meeting the needs just described. Such on site fabrication for common shapes in custom lengths is therefore often very time consuming and therefore costly for the installer and ultimately the customer.

While there exists a large number of metal forming devices most are very large and cumbersome, often requiring independent power sources and therefore very costly or requiring a dedicated vehicle for their transportation. The use of such large devices is therefore not practical for the average roofer, even one performing a large number of roofing jobs that require the on site fabrication of a number of commonly shaped, but custom length flashing parts.

The availability of a compact, inexpensive and readily hand operated metal former capable of forming metal flashing and the like in custom lengths that can be transported in, for example, an ordinary pick-up truck without occupying an undue amount of cargo space would, therefore, be of significant value to the roofing community.

OBJECT OF THE INVENTION

It is therefore an object of the present invention to provide a compact, low cost and preferably hand operated metal forming device that meets the needs of the roofing community for the on-site, custom fabrication of metal flashing and the like.

SUMMARY OF THE INVENTION

The present invention provides a compact, portable metal forming device comprising: 1) a frame having entry and exit ends; 2) guide means adjacent the entry end for guiding a sheet of metal to be formed to a hand operated drive assembly supported within the frame that engages the metal sheet and drives it, through the operation of a series of gear linked separately journaled forming roll pairs mounted in the frame, 3) adjacent the exit end an adjustable cam wheel that engages one edge of the metal sheet and forms that edge just prior to the metal sheet reaching the exit end, and 4) forming the exit end, a guillotine cutter including a shaped exit aperture for cutting the formed metal sheet to any selected length.

DETAILED DESCRIPTION

Figure 1:
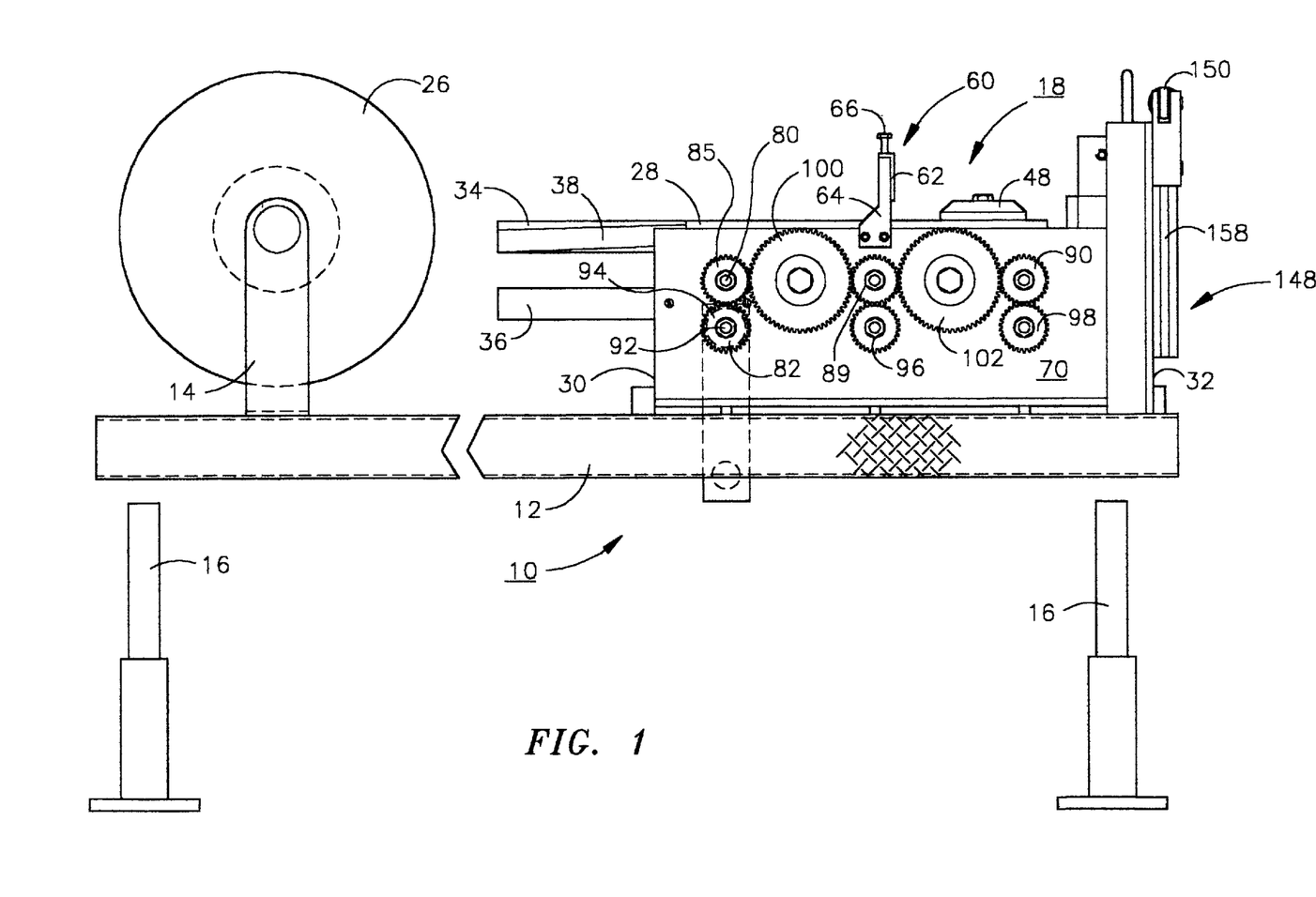
FIG. 1 is a side view of the complete metal forming device of the present invention.
Figure 4:
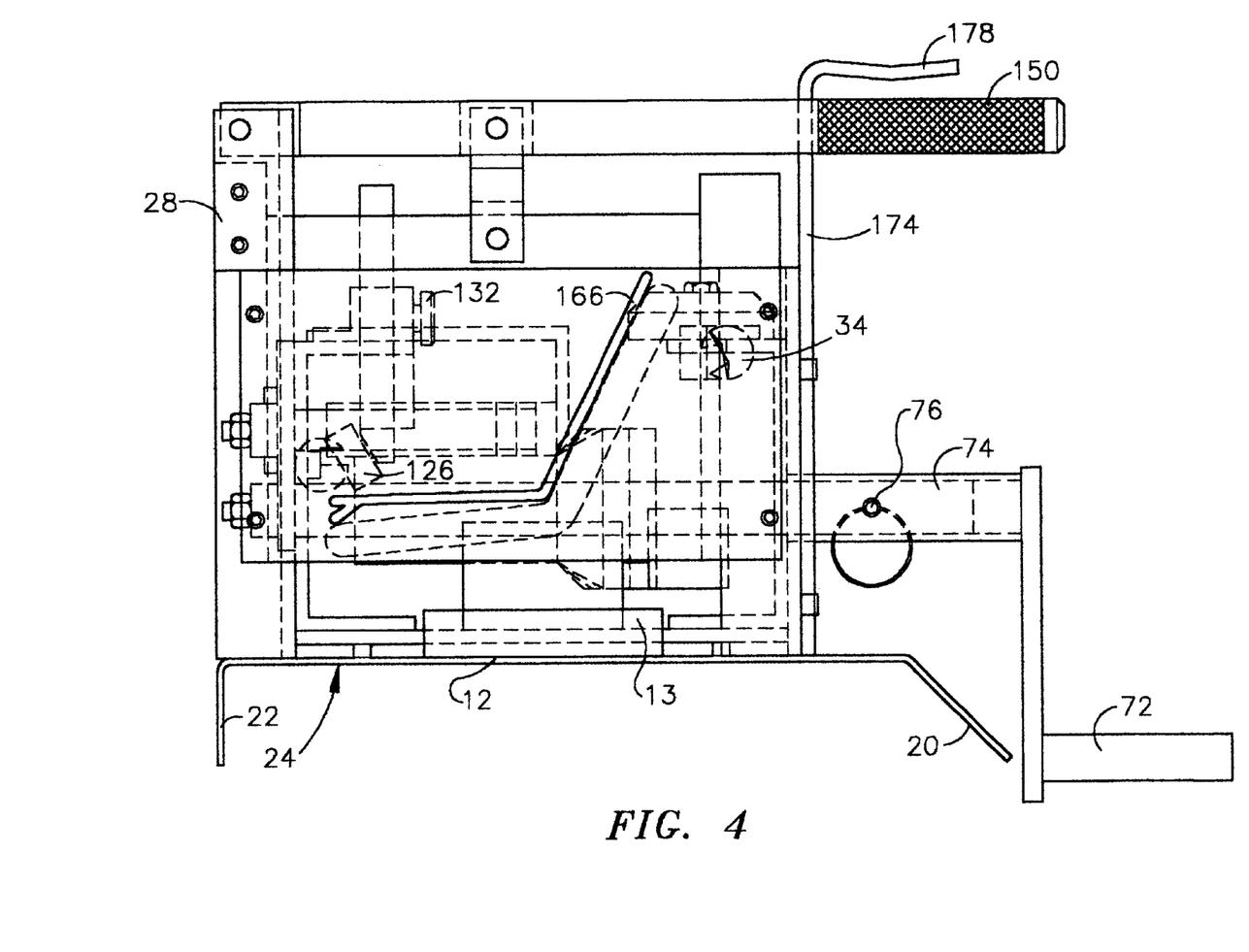
FIG. 4 is a partially phantom exit end view of the metal forming device of the present invention.
Figure 5:
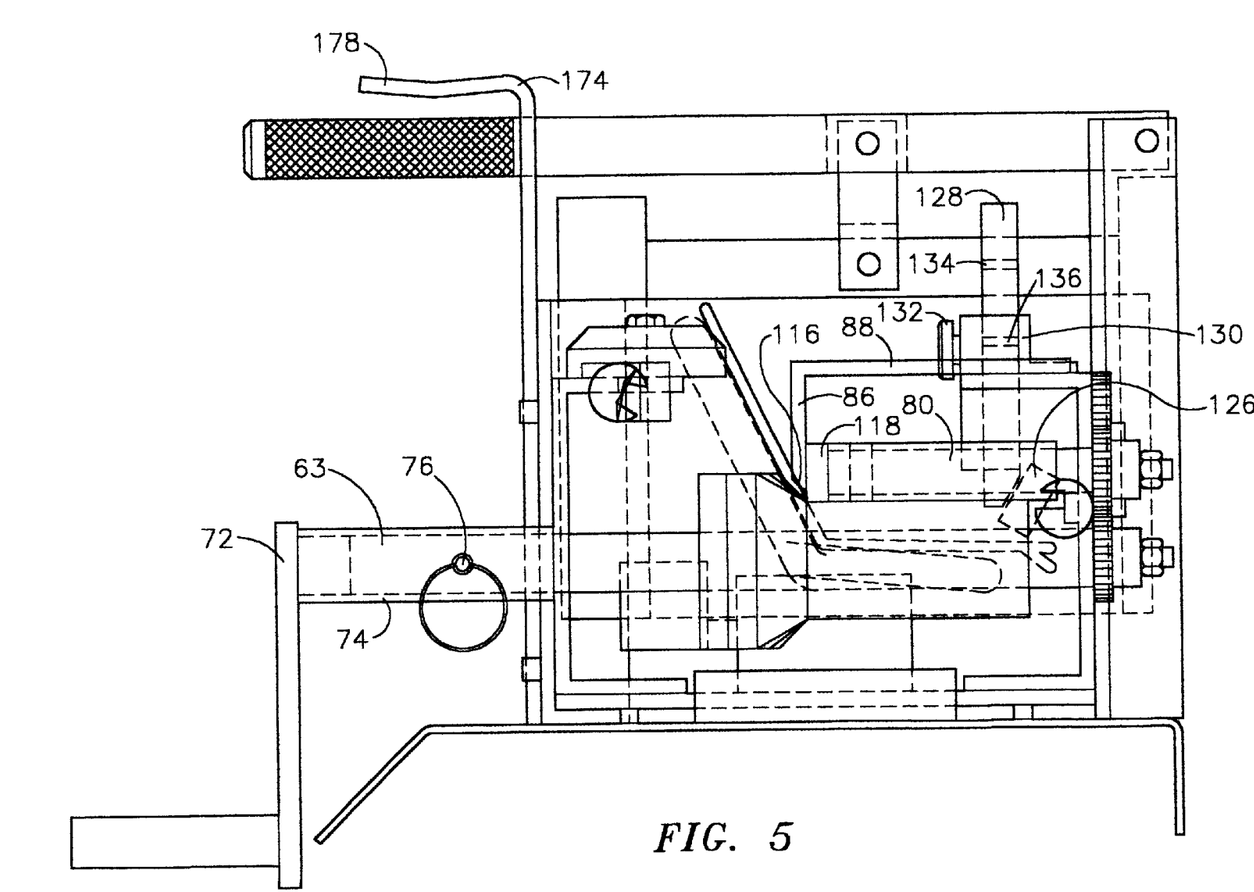
FIG. 5 is a partially phantom entry end view of the metal forming device of the present invention.

Referring now to FIG. 1, the complete metal forming system 10 of the present invention includes a platform 12, a payoff 14, and where necessary for mounting, for example, on the side rail of a pick-up truck, adjustable jacks 16 for that side of platform 12 that is not supported by the side rail, and metal forming apparatus 18 that is the core of the present invention. Platform 12 may be fabricated from any suitable material such as aluminum or steel and for appearance may be of so-called "diamond plate" high brilliance aluminum. The purpose of platform 12 is simply to provide a convenient co-location for payoff 14 and metal forming apparatus 18. According to a preferred embodiment, platform 12, as best shown in FIG. 4, has a slanted flange 20 and an orthogonal flange 22 extending downward therefrom. Orthogonal flange 22 serves as the location of jacks 16 that can be secured to platform 12 in any suitable fashion (bolts, screws brackets, etc.) and support that side of platform 12 by bearing against the bed of a pick-up truck (not shown) and the bottom surface 24 of platform 12 when slanted flange 20 is laid over the pick-up truck side rail (not shown).

Sheet metal forming apparatus 18 may be permanently or removably attached to platform 12 in any suitable fashion such as with bolts or otherwise. One preferred method of attachment best shown in FIG. 2 utilizes a cut out block 13 removably bolted to platform 12 that engages bottom 15 of frame 28.

Payoff 14 can be of any suitable design that permits support of a coil 26 of metal and allows the controlled extraction of sheet metal therefrom. Thus, it is highly desirable that payoff 14 be equipped with some type of friction or brake mechanism to inhibit uncoiling of the sheet metal in an uncontrolled fashion.

As will be obvious to the skilled artisan, metal forming apparatus 18 as described hereinafter can be used independently of any platform 12, if otherwise securely located or without payoff 14, if discrete sheets of metal to be formed are introduced thereto.

As previously stated, the core of the present invention is metal forming apparatus 18. As shown in the various Figures, metal forming apparatus 18 comprises a frame 28 having an entry end 30, a discharge or exit end 32, a top 87, opposing sides 68 and 70 and a bottom 15. Extending outward from entry end 30 is a pair of parallel offset guide bars 34 and 36 having grooves 38 and 40 respectively therein. Grooves 38 and 40 begin the forming process by engaging the edges of an inserted piece of sheet metal (not shown) and, as the sheet is pushed or advanced therein, because of their offset, aligning the sheet for engagement with the initial set of forming rolls 42 and 44 described hereinafter. For purposes of convenience hereinafter, the metal sheet will be referred to as having a left and a right side, the left side being that which engages groove 38 and the right side being that which engages groove 40. Insertion of the metal sheet into grooves 38 and 40 as just described causes the metal sheet to assume a general U-shape between grooves 38 and 40. The presence of this U-shape ease entry of the metal sheet into metal forming apparatus 18. In the absence of the formation of this general U-shape caused by insertion of the metal sheet edges as just described, the metal sheet will tend to buckle. Such buckling could alternatively be inhibited by the inclusion of additional forming rolls, but the use of grooves 38 and 40 in offset guide bars 34 and 36 obviates the need for such additional forming rolls thereby permitting minimization of the length of metal forming apparatus 18. Edge guide 46 and roller 48 proximate the left edge of the inserted sheet metal serve to further guide the edge of an inserted sheet of metal as it progresses through the interior 50 of frame 28 and is progressively formed by engagement with roll pairs 42 and 44, 52 and 54 and 56 and 58.

Figure 2:
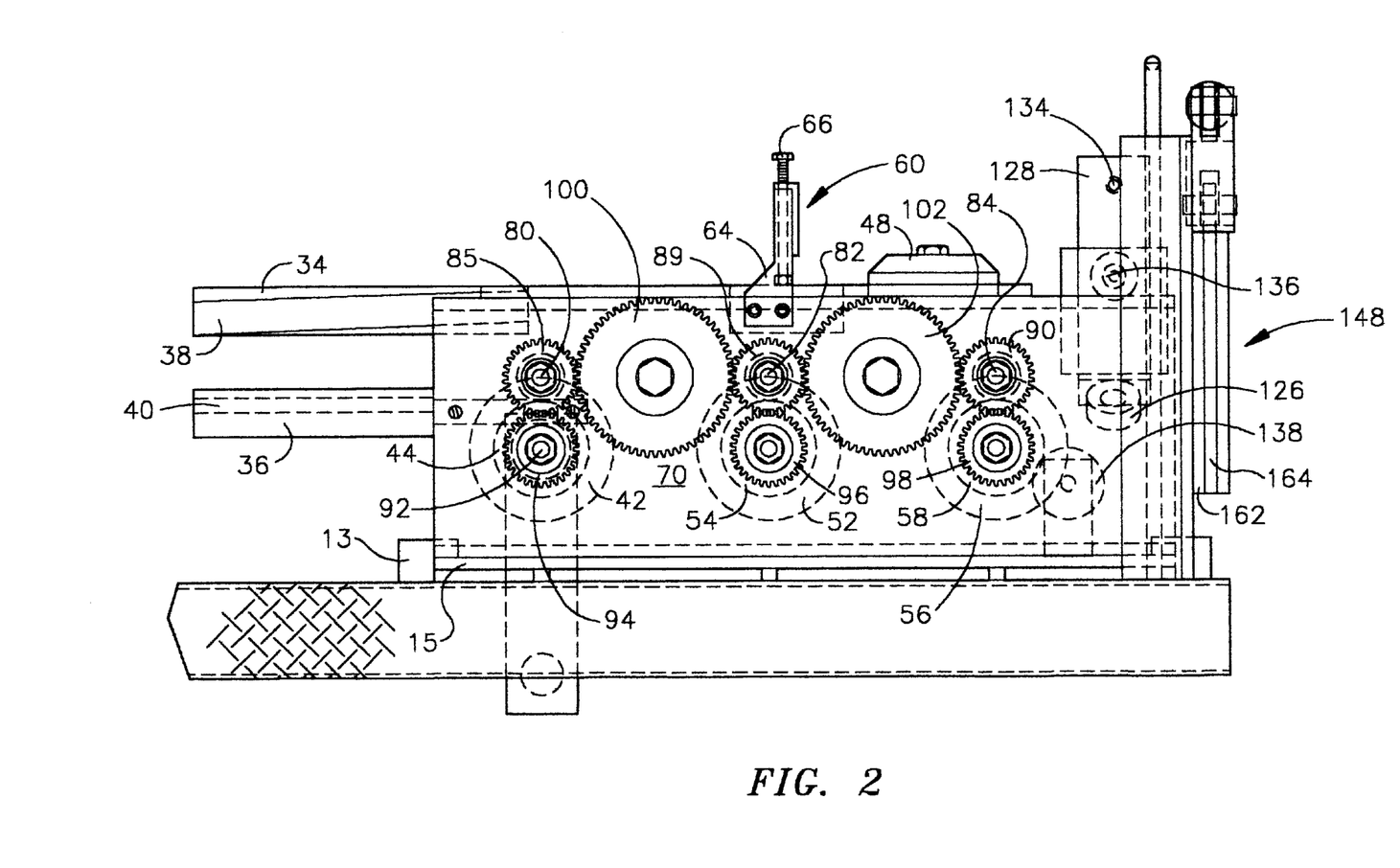
FIG. 2 is a partially phantom side view of the metal forming device of the present invention.
Figure 3:
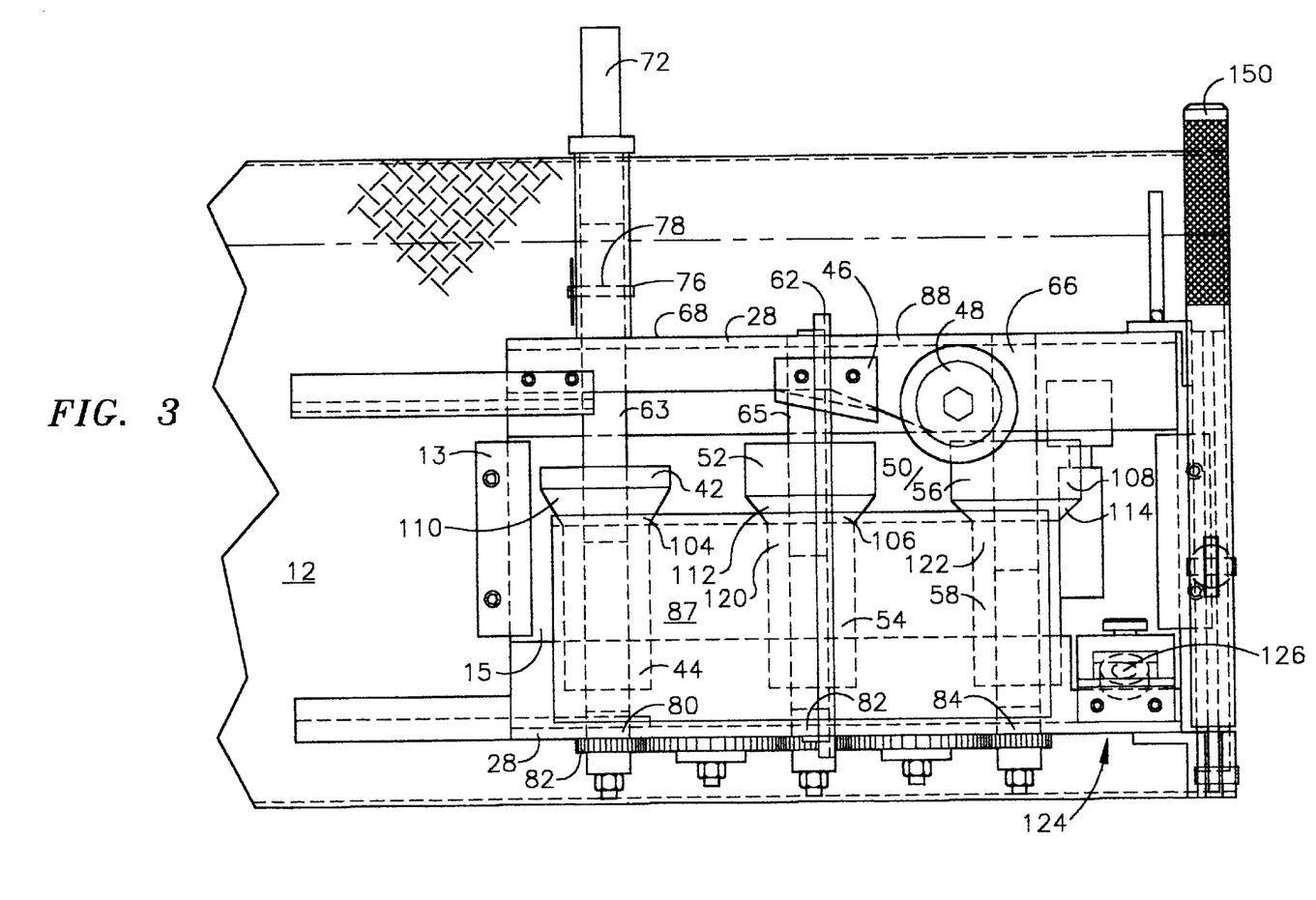
FIG. 3 is a partially phantom top view of the metal forming device of the present invention.

In the embodiment depicted in FIGS. 1, 2, and 3, a stiffener assembly 60 is shown. Stiffener assembly 60 comprises a brace 62 mounted to brackets 64 that are in turn attached to frame 28. An adjustment bolt 66 is threaded through brace 62 to permit stiffening or fine adjustment of frame 28 when frame 28 undergoes deflection due to the thickness of the metal being formed in metal forming apparatus 18 or otherwise. If frame 28 is constructed from sufficiently heavy metal, or metal forming apparatus 18 is used to form only very light metal sheet, stiffener assembly 60 may be eliminated entirely. Metal forming apparatus 18 in its depicted configuration is capable of forming, for example, aluminum flashing and the like up to a thickness of about 0.030" and the presence of stiffening assembly 60 permits loosening or tightening of the forming rolls to accommodate varying thicknesses of metal sheet.

Each of forming rolls 42, 52 and 56 is mounted on its own independent shaft (shafts 63, 65 and 66) that are separately journaled in sides 68 and 70 of frame 28. Shaft 63 is extended beyond side 68 to permit attachment of crank or handle 72 that serves as the driving means for metal forming apparatus 18. Crank 72 is preferably removably mounted on shaft 63 by provision of engagement portion 74 on handle 72 that slips over shaft 63 and is fixed in place by the insertion of a pin 76 or other similar fastener that penetrates an aperture 78 in shaft 63 and engagement portion 74. Turning of handle 72 in a clockwise direction thus turns shaft 63 and attached forming roll 42.

Each of drive rolls 44, 54 and 58 that are mounted above and parallel to each of corresponding forming rolls 42, 52 and 56 also has a shaft 80, 82 and 84 journaled in side 70 of frame 28 at one end thereof and in side 86 of internal frame 88 at the other end thereof. Internal frame 88 is formed by the addition of downward extending flange 86 from the top 87 of internal frame 88. Attached to the ends of shafts 80, 82 and 84 are gears 85, 89 and 90.

Attached to extremity 92 of shaft 63 is a principal drive gear 94 that is also turned when handle 72 is turned in a clockwise direction by virtue of its connection to shaft 62. Similarly, shafts 64 and 66 have gears 96 and 98 attached to their extremities that penetrate side 70 of frame 28. Each of gear sets 94 and 85, 89 and 96 and 90 and 98 are in engaging relationship with each other. Between each of the above-described gear sets, is a transfer gear 100 and 102 respectively that serves to transfer rotary motion from gear 85 to gear 89 and from gear 89 to gear 90. Thus, when handle 72 is rotated in a clockwise direction, rotary motion is transferred from gear 94 to gear 85, from gear 85 to transfer gear 100, from transfer gear 100 to gear 89, from gear 89 to gears 96 and 102, from gear 102 to gear 90 and from gear 90 to gear 98. Thus, turning of handle 72 causes all of the various gears, shafts and their attached rolls to advance in unison and a piece of sheet metal introduced into grooves 38 and 40 and brought into engagement with roll pair 42 and 44 is caused to advanced through metal forming apparatus 18.

Forming rolls 42, 52 and 56 include at their extremities opposing those journaled in side wall 70 and beyond side wall 86 of inner frame 88 enlarged forming portions 104, 106 and 108 respectively that include tapered portions 110, 112 and 114 that are tapered upward toward these extremities at progressively larger angles so as to progressively form sheet metal inserted between roll pairs 42 and 44, 52 and 54 and 56 and 58. Lower edge 116 of side or flange 86 is similarly tapered to accommodate such metal during deformation or forming.

As will be apparent to the skilled artisan, both guide or drive rolls 44, 54 and 58 and forming rolls 42, 52 and 56 should be coated or surfaced with some appropriate material. In the case of drive rolls 44, 54, and 58, an adherent material such as polyethylene or polypropylene that provides a gripping surface that "grabs" the sheet metal surface as it advances is highly desirable. It may further be desirable to coat the extremities 118, 120 and 122 of drive rolls 44, 54 and 56 near or at the points where they meet tapered regions 110, 112 and 114 with a "tougher" material such as Delrin, a nylon material commonly used for rollers and the like, that presents a tough but "slick" or slippery surface to the metal sheet passing thereover. Delrin or some such similar tough but slippery material is similarly useful as the surface of forming rolls 42, 52 ands 56 as well as previously described guide roll 48.

As will further be apparent to the skilled artisan, while forming apparatus 18 depicted herein is shown as having three progressive forming rolls, a preferred configuration, a system that utilizes as few as two forming rolls or more than three forming rolls may also be considered effective.

Figure 8:
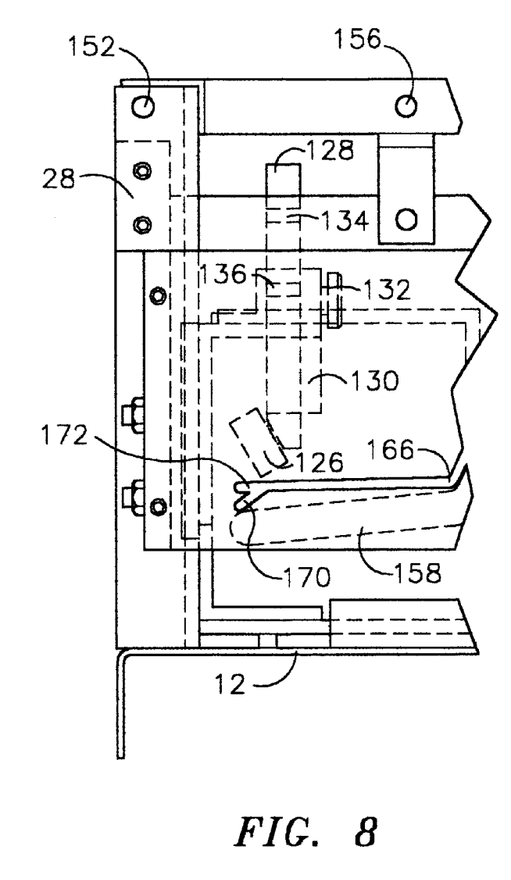
FIG. 8 is a partially phantom, cutaway view showing the final metal edge, forming wheel in a first position.
Figure 9:
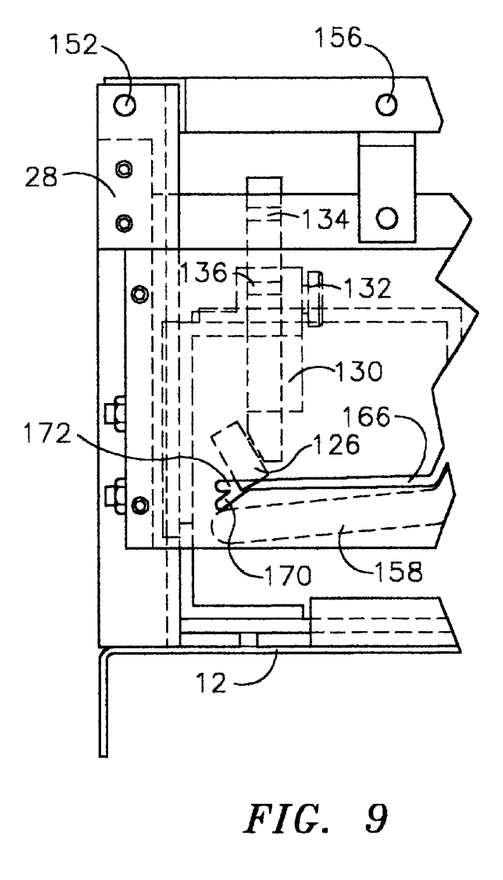
FIG. 9 is a partially phantom, cutaway view showing the final metal edge, forming wheel in a second forming or bending position.
Figure 10:
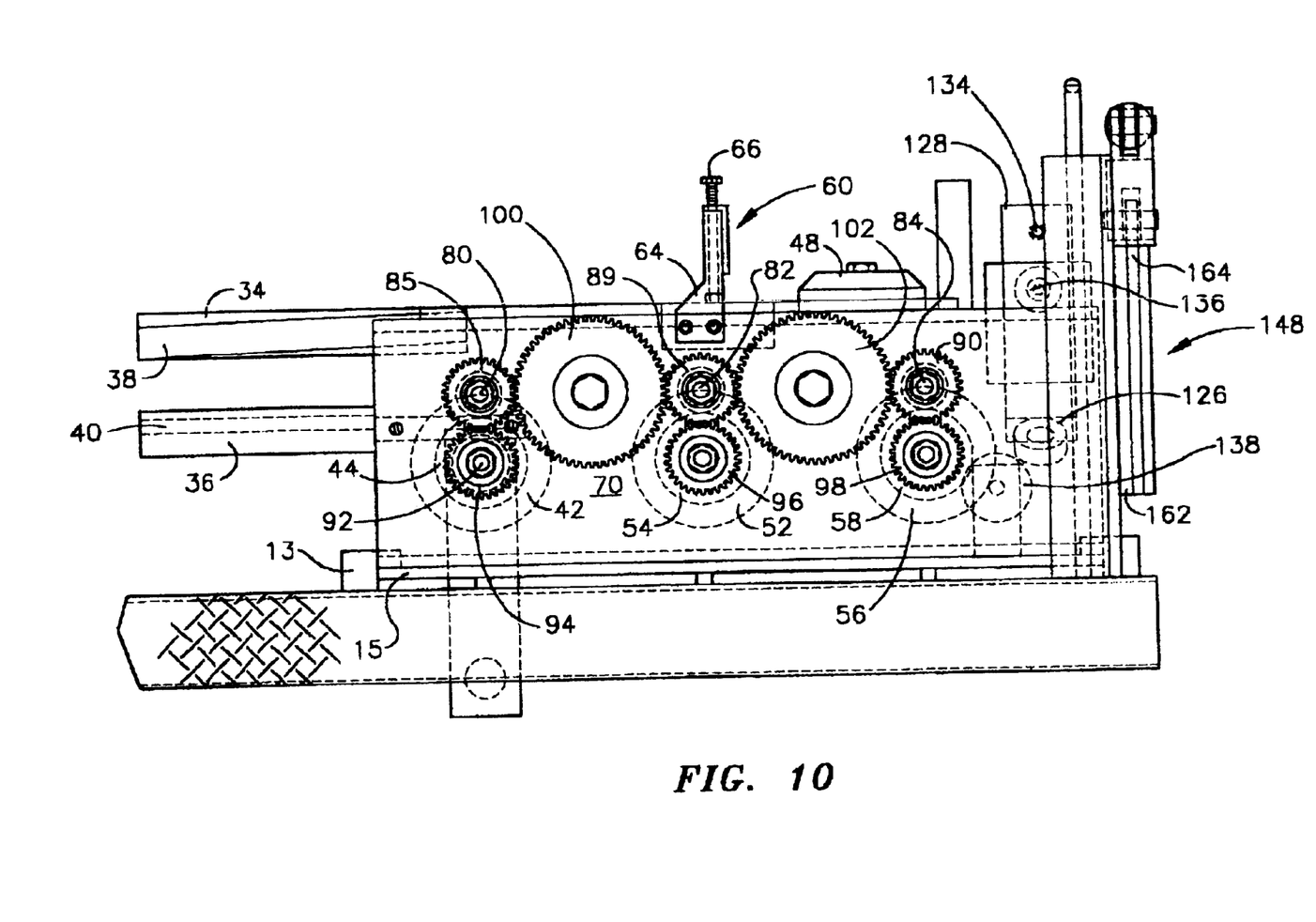
FIG. 10 is partially phantom view of the metal forming apparatus of the present invention showing the final metal edge forming wheel in the down or metal bending position.

Downstream of final forming roll 56 and adjacent to side wall 70 of frame 28 is adjustable edge forming assembly 124. Edge forming assembly 124, best seen in FIGS. 8 and 9, comprises an angularly oriented cam wheel 126 rotatably attached to an indexable slide arm 128 capable of moving up and down ( being indexed) within channel bracket 130. Positioning of indexable slide arm 128 and attached cam or forming wheel 126 is preferably achieved through location of set bolt 132 in predrilled apertures 134 and 136 in slide arm 128. Addressing cam wheel 126 is guide roll 138. The right edge of sheet metal engaging cam wheel 126 is forced between cam wheel 126 and guide roll 138 causing the edge to bend downward when slide arm 128 is in the down position as shown in FIG. 9, or to pass unformed when cam wheel 126 is in the up position as depicted in FIG. 8. The particular location of cam wheel 126 will be dependent upon whether or not the final downward bend of the right sheet metal edge imparted by edge follower assembly 124 is required in the flashing installation for which the metal is being fabricated. Both cam wheel 126 and guide roll 138 are preferably coated with or fabricated from Delrin or some similar "tough" and "slick" coating.

The final element of the metal forming apparatus 18 of the present invention comprises guillotine cutter assembly 148. Guillotine cutter assembly 148 comprises a cutting arm 150 rotatably attached to frame 28 at point 152 and rotatably to connector 154 at a point 156 intermediate the ends of cutting arm 150. Connector is in turn rotatably connected to cutting blade 158 at point 160. Cutting blade 158 is slideably located between a pair of guide plates 162 and 164 that form the end wall of the exit end of frame 28. Each of guide plates 162 and 164 include an exit slot 166 that registers with a similar, but oversized cutting slot 168 in cutting blade 158.

Figure 6:
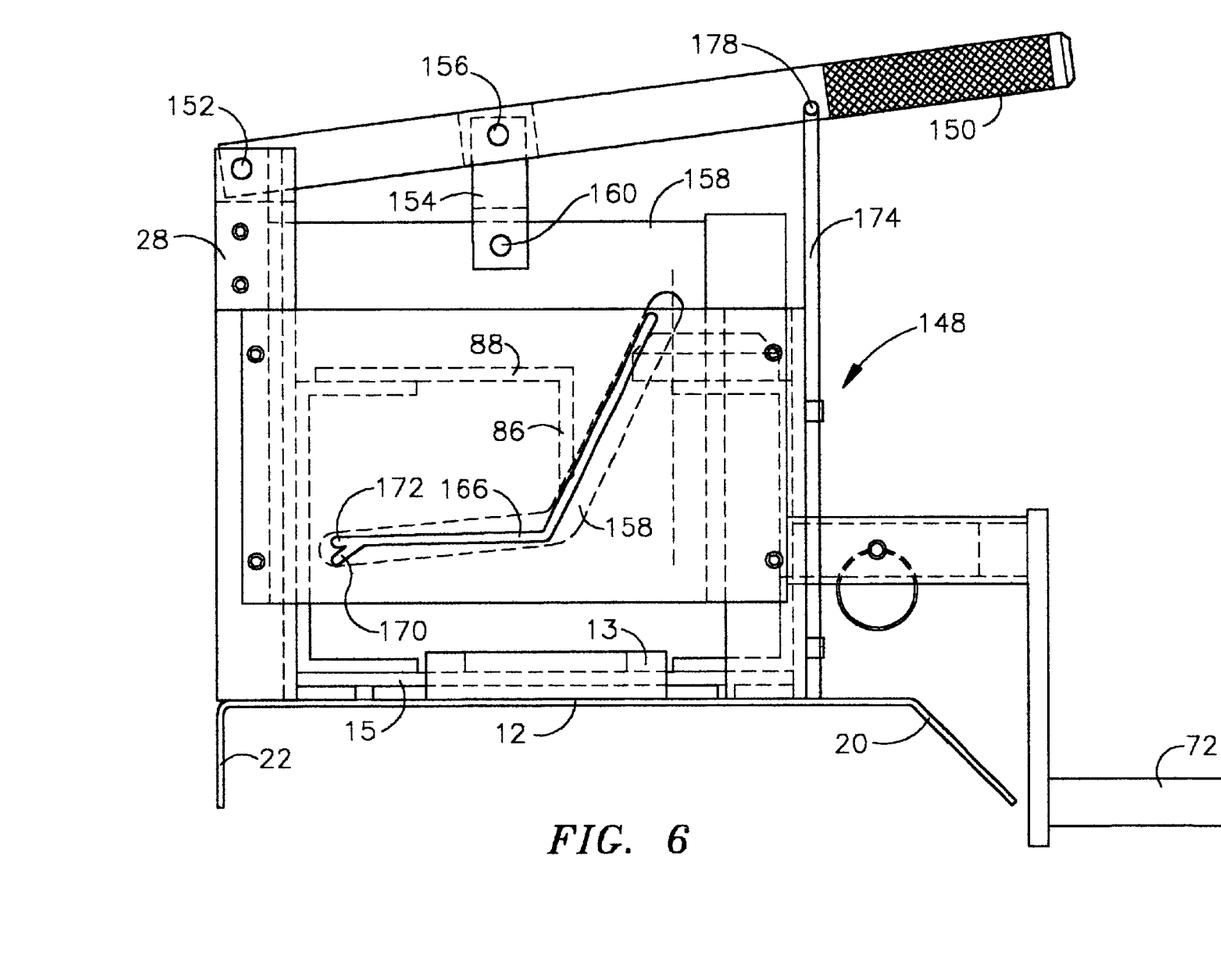
FIG. 6 is a partially phantom exit end view of the metal forming device of the present invention showing the guillotine cutter in the protected or operating position at the exit end.
Figure 7:
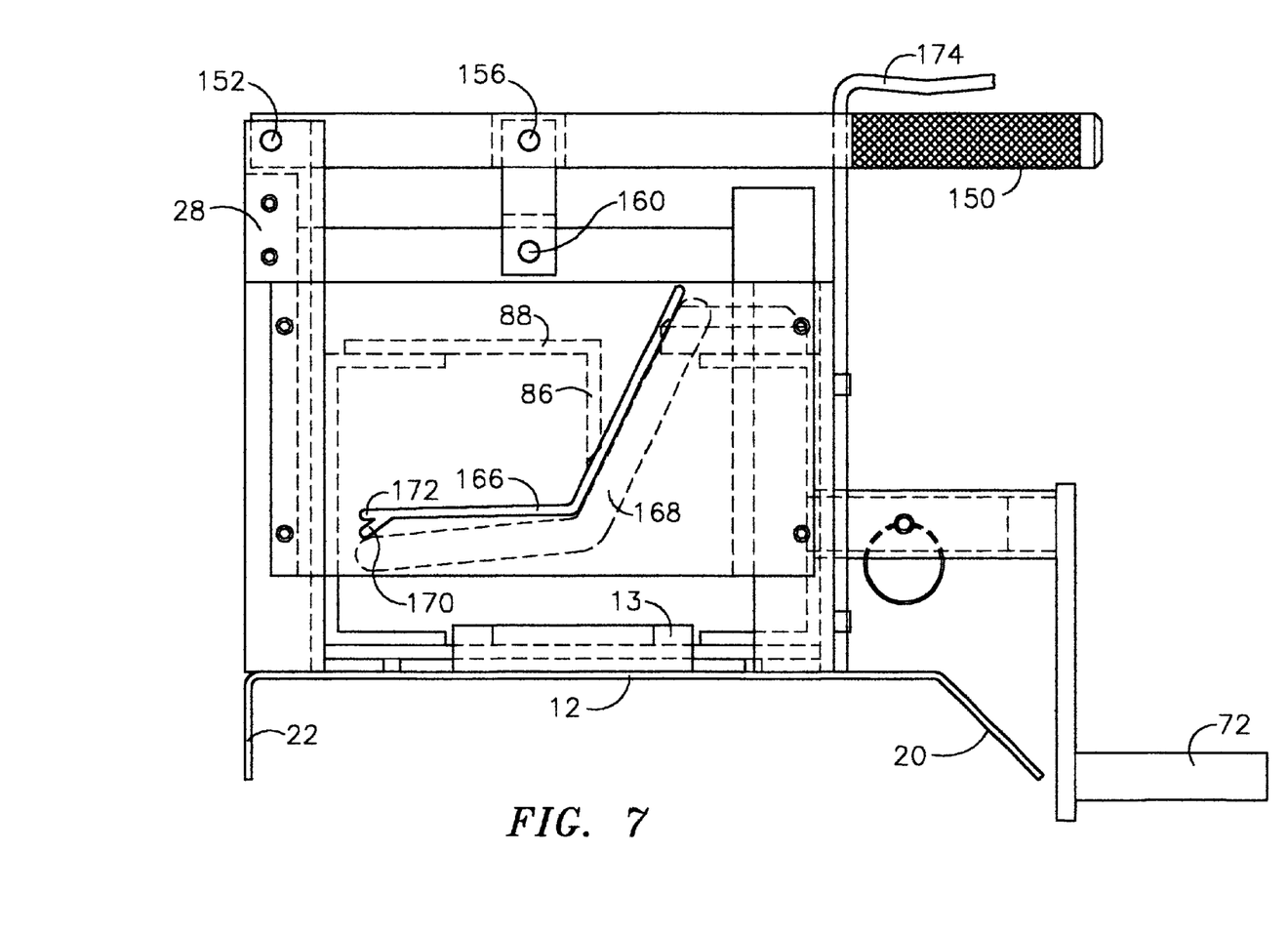
FIG. 7 is a partially phantom exit end view of the metal forming device of the present invention showing the guillotine cutter in the cutting position.

Exit slots 166 are configured to the shape of the formed sheet metal that will exit metal forming apparatus 18. If cam wheel 126 is in the down position, as depicted in FIG. 9, the right metal edge will be bent downward and will exit through arm 170 of exit slots 166. The right metal edge will exit through arm 172 of exit slot 166 if cam wheel 126 is in the up position as depicted in FIG. 8 and the right sheet metal edge is not finally formed or bent. Thus, during fabrication of sheet metal, cutting arm 150 is retained in the up position as shown in FIG. 6 until the appropriate length of metal is formed and advanced through slots 166 and 168. Cutting arm 150 is then pushed downward as shown in FIG. 7 and the appropriate length of formed sheet metal is cut or sheared at the desired location.

To retain cutting arm 150 in the "up" position during fabrication and as a safety measure, rotating support arm 174 is provided. During fabrication, rotating support arm 174 is in the position shown in FIG. 6 with portion 178 thereof supporting cutting arm 150. To cut, cutting arm 150 is lifted slightly, support arm 174 rotated 90° to the position shown in FIG. 7 and cutting arm 150 depressed as shown in FIG. 7 to cut metal that has exited slots 166.

The metal forming apparatus 18 of the instant invention is generally designed to fabricate sheet metal at a width of about 8 inches, but it will be readily understood that both wider and narrower such devices can be similarly manufactured for the fabrication of narrower and wider sheet metal.

There has thus been described a compact portable and easily hand operated sheet metal forming device suitable for mounting on the side rail of a pick-up truck and that is capable of producing custom lengths of at least two discrete commonly used flashing shapes.

As the invention has been described, it will be apparent to those skilled in the art that the same may be varied in many ways without departing from the spirit and scope of the invention. Any and all such modifications are intended to be included within the scope of the appended claims.

What is claimed is:

1. A compact, portable sheet metal forming apparatus comprising:
   A) a frame having an entry and an exit end and opposing sides;
   B) an internal frame formed by the insertion of a downward extending flange between said opposing sides;
   C) parallel, offset slotted guide bars extending outwardly from said entry end that guide sheet metal to be formed;
   D) a series of at least two forming roll pairs arranged to receive said sheet metal from said guide bars comprising:
      I) a forming roll mounted on a shaft having first and second ends journaled in said opposing sides; and
      II) a drive roll mounted on a shaft having first and second ends, said first end journaled in said downward extending flange and said second end journaled in one of said sides;
   E) a handle attached to said first end of one of said forming roll shafts;
   F) interlocking gears attached to said second ends of said forming roll and said drive roll shafts drivingly connected with each other;
   G) interlocking transfer gears mounted on shafts journaled in said one side in which said second ends are journaled and drivingly engaging at least one of said interlocking gears of each of said forming roll pairs;
   H) downstream of said at least two forming roll pairs, proximate one of said side walls an adjustable edge forming assembly comprising:
      I) a cam wheel; and
      II) a guide roll facing said cam wheel; and
   I) a guillotine cutter forming said exit end for selectively cutting custom lengths of sheet metal formed in said metal forming apparatus.

2. The sheet metal forming apparatus of claim 1 wherein said forming rolls are coated with a tough nylon coating.

3. The sheet metal forming apparatus of claim 1 wherein said guillotine cutter comprises a cutting blade located between a pair of plates, said plates having slots therein in the shape of sheet metal formed in the forming apparatus and said cutting blade having a slot therein that lies in registration with said plate slots when said forming apparatus is operating, said cutting blade slot being larger than said plate slots but similarly adapted to permit the passage of sheet metal formed in said forming apparatus.

4. The sheet metal forming apparatus of claim 3 wherein said forming rolls are coated with a tough nylon coating and said drive rolls are at least partially coated with an adherent material that permits gripping of the surface of inserted sheet metal.

5. The sheet metal forming apparatus of claim 4 wherein said forming rolls include a tapered forming portion and that portion of said drive rolls proximate said tapered forming portion are coated with a tough nylon coating.

6. The sheet metal forming apparatus of claim 1 further including a platform to which said sheet metal forming apparatus is fastened and a payoff attached to said platform near said entry end such that sheet metal on said payoff may be fed to said offset parallel guide bars for introduction into said sheet metal forming apparatus.

7. The sheet metal forming apparatus of claim 1 wherein said handle includes an engagement portion that slips over said first end of one of said forming roll shafts and is fastened thereto by means of a fastener that penetrates said engagement portion and said forming roll shaft to permit attachment thereof during operation and removal thereof in transit.

8. The metal forming apparatus of claim 1 wherein said adjustable edge forming assembly comprises:
   A) an angularly oriented cam wheel;
   B) a vertically indexable slide arm attached to said angularly oriented cam wheel;
   C) a channel bracket attached to one of said sides within which said vertically indexable slide arm moves up and down;
   D) a set bolt or screw in said channel bracket for setting said indexable slide arm in at least two different positions; and
   E) a guide roll that faces the cam wheel to permit forming of the edge of sheet metal forced between said cam wheel and said guide roll.

* * * * *